United States Patent Office 3,481,495
Patented Dec. 2, 1969

3,481,495
ON-BOARD LOADING AND UNLOADING SYSTEM
Katsumi Iwashita, Masasuke Yoshimura, Seizaburo Miyazaki, and Kunio Tamaki, Tokyo, Japan, assignors to Nippon Kakan Kabushiki Kaisha, Tokyo, Japan
Filed Dec. 7, 1967, Ser. No. 688,769
Claims priority, application Japan, Dec. 17, 1966, 41/82,517
Int. Cl. B65g 52/24; B63b 27/00
U.S. Cl. 214—15                     2 Claims

ABSTRACT OF THE DISCLOSURE

In an on-board loading and unloading system adapted to convey loose material by the action of vacuum suction component parts of the system are arranged such that during loading the material supplied to a hopper on a deck of a ship is conveyed to a pneumatic conveyer through a main belt conveyer and thence into a hold through an air separating tank and a vacuum pump whereas during unloading the material in the hold is conveyed to an outboard conveyer equipment through a suction nozzle, the separating tank, the vacuum pump and the main belt conveyer.

---

This invention relates to an on-board loading and unloading system wherein loading and unloading of loose goods such as wood chip are effected by vacuum suction and air force transportation and has its general object to improve the efficiency of loading and unloading goods.

Grab buckets have been used on cargo ships to load and unload loose goods such as wood chip, grain and the like. However, as the loading and unloading operations by grab buckets are intermittent, the flow of goods is discontinuous with the result that the goods to be transferred will stagnate or clog the path of the goods. In order to avoid this it is necessary to design the succeeding transfer device to assure continuous flow of the goods.

Moreover with grab buckets, it is necessary to increase the number of operators in order to increase the quantity to be transported or to increase the quantity to be transferred per unit time. In addition a certain quantity of the goods is lost during transfer or remain in the bottom of the hold thus reducing the efficiency of loading and unloading operations due to the labour and time required for disposing such lost or remaining goods. Further, grab buckets require larger hatchway as well as larger hatch cover, thus increasing the cost of the ship.

It is therefore an object of this invention to provide an improved vacuum suction, air force transfer system.

In accordance with this invention there is provided an on-board loading and unloading system comprising a pneumatic conveyer movable on a deck of a ship, a hopper on said deck, a main belt conveyer extending between said pneumatic conveyer and said hopper, a suction nozzle adapted to suck up goods on said main conveyer, a vacuum pump associated with said pneumatic conveyer to apply suction to said suction nozzle, a separating tank to separate air from sucked-up goods and to exhaust the separated air, an air trimmer to supply goods into a hold and a suction nozzle associated with said pneumatic conveyer whereby during loading the goods supplied to said hopper from an outboard conveyer equipment is conveyed to said pneumatic conveyer through said hopper and belt conveyer and thence into said hold through said separating tank and said vacuum pump whereas during unloading, the goods in said hold are conveyed to said outboard conveyer equipment through said suction nozzle, said separating tank, vacuum pump and said main belt conveyer.

This invention will be more fully understood from the following detailed description taken in connection with the accompanying drawing in which.

Figure 1:
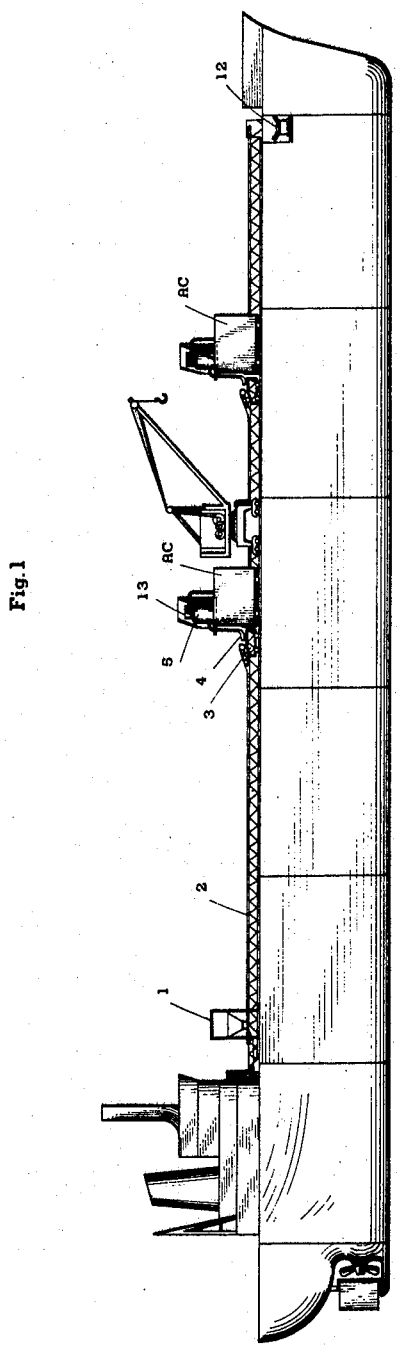
FIG. 1 is a side elevation of a cargo ship equipped with the on-board loading and unloading system embodying this invention.
Figure 2:
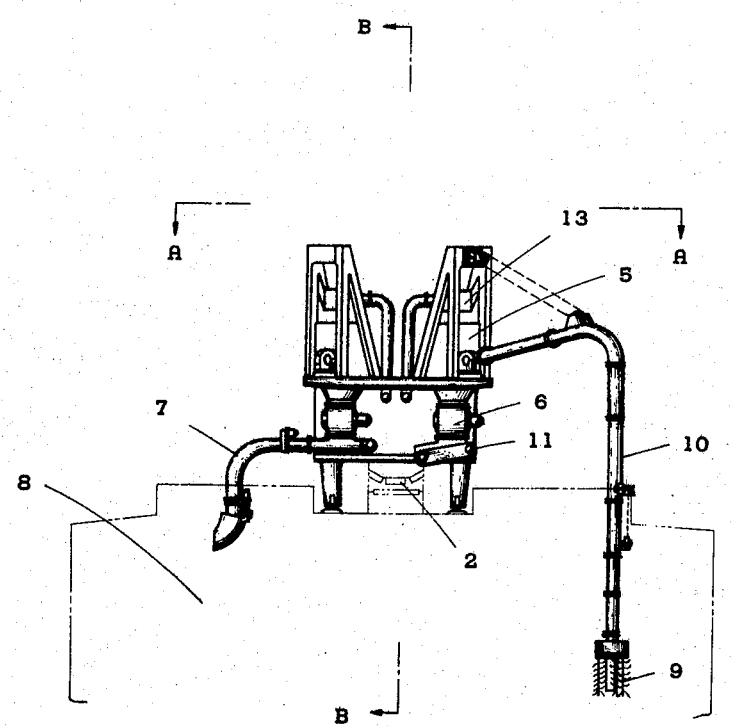
FIG. 2 is a front view of a conveyer.
Figure 3:
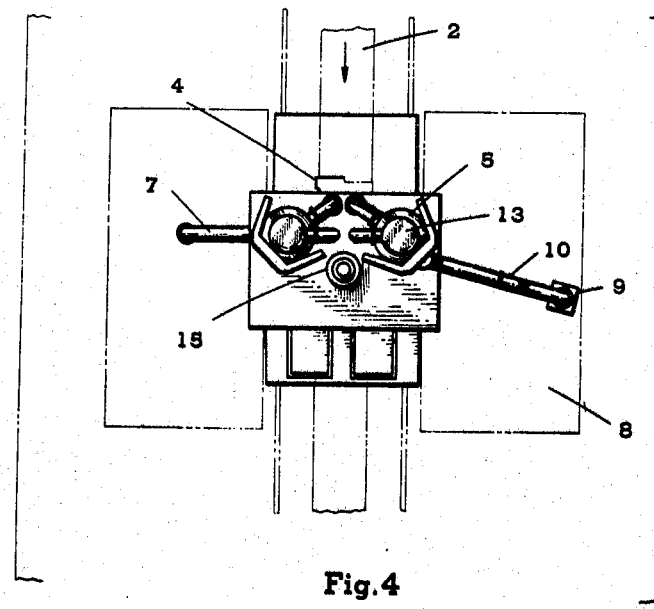
FIG. 3 is a plan view of the conveyer shown in FIG. 2.
Figure 4:
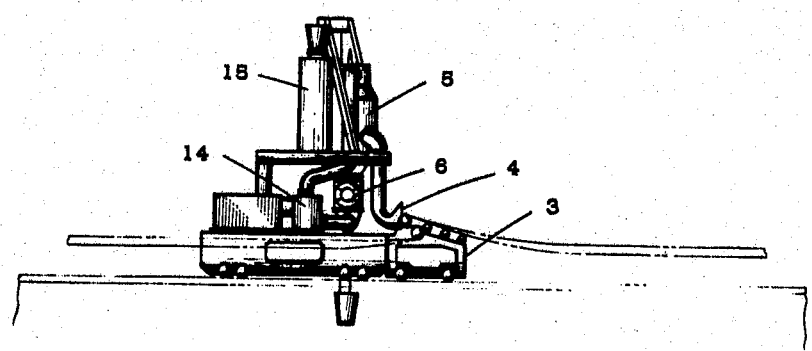
FIG. 4 shows a section taken taken along a line IV—IV of FIG. 2.

Referring now to FIG. 1 of the accompanying drawing, on the deck of a cargo ship there are provided a hopper 1 and a tripper 3 of a vacuum suction, air transfer apparatus AC (hereinafter abbreviated as a pneumatic conveyer) which are interconnected by a belt conveyer 2. The pneumatic conveyer comprises a vacuum pump and various apparatus to be described later and is arranged to run on rails on the deck. One end of a suction nozzle 4 of the pneumatic conveyer AC is disposed just above one end of the conveyer 2 to suck up goods conveyed by belt conveyor 2. The other end of the suction nozzle 4 is connected to the suction side of a vacuum pump 14 via a separating tank 5 and a dust remover 13. The separating tank 5 serves to separate air from the goods to be conveyed. Dust separated by the dust separator 13 is sucked by the vacuum pump 14 while the goods to be conveyed are discharged downwardly into a removable air trimmer 7 (FIG. 2) by means of a rotary discharger 6 located beneath separating tank 5. The air trimmer 7 is connected to the discharge side of the vacuum pump 14 via a pipe to uniformly pile the goods transferred from the rotary discharger 6 in the space within the hold. A suction nozzle 9 with an agitator (not shown) is provided in the hold as shown in FIG. 2 and is communicated with the separating tank 5 by way of a suction pipe 10. Reference numeral 12 in FIG. 12 shows a discharge conveyer and 15 in FIG. 4 shows a silencer.

The loading operation is as follows: Wood chip and the like loose material conveyed from outboard conveyer equipment is supplied to the hopper 1 and then onto the main conveyer 2. Upon reaching the pneumatic conveyer AC, the chip will be sucked up by the suction nozzle 4 from the tripper 3 and then introduced into the separating tank 5. The chip in the separating tank 5 is discharged downwardly by the action of the rotary discharger 6 at the bottom of the separating tank and then supplied into the air trimmer 7 located beneath the rotary discharger 6. Thereafter the chip is uniformly piled in the hold 8 by the air current created by the vacuum pump 14.

Figure 5:
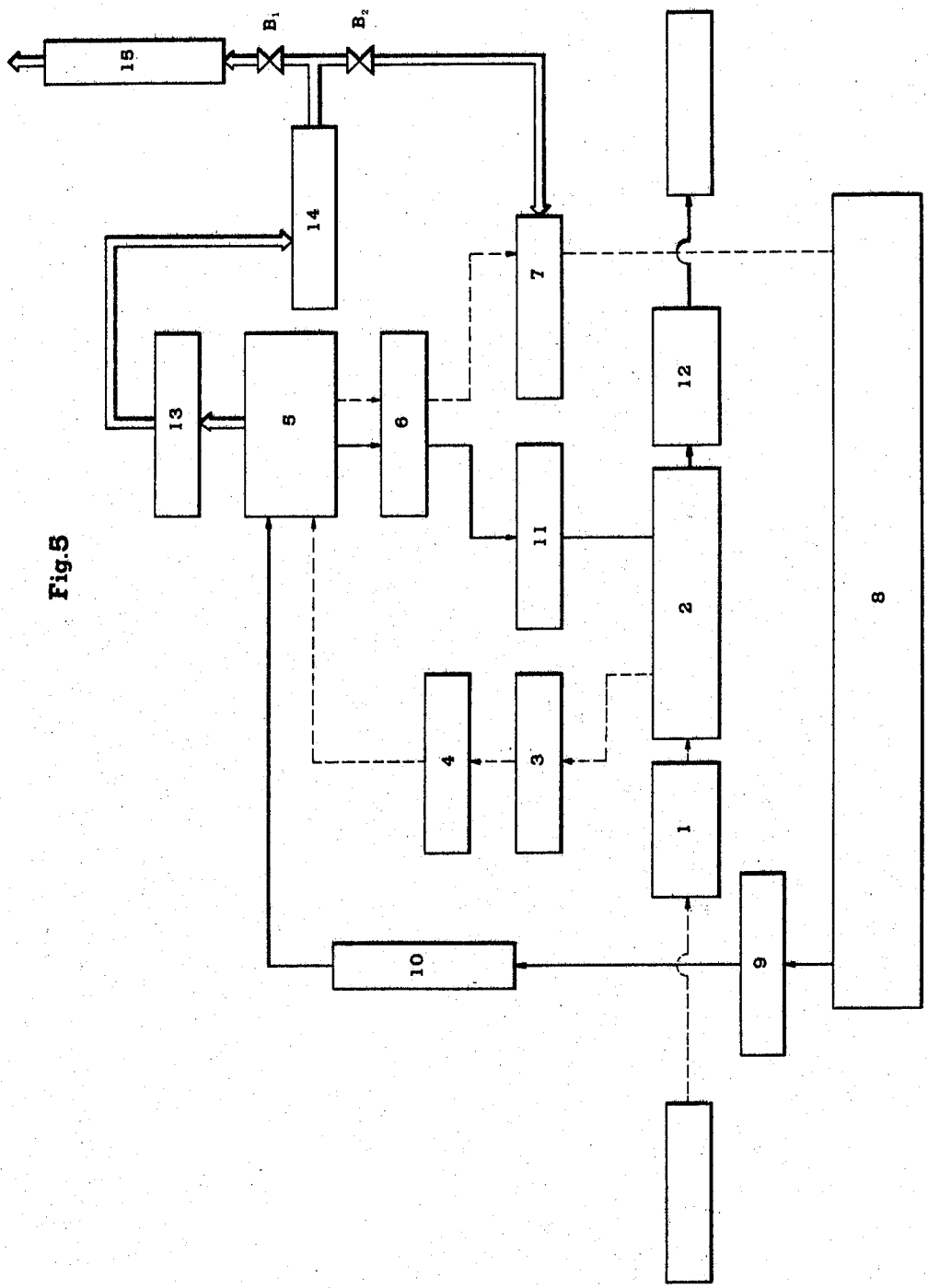
FIG. 5 is a flow chart to explain the operation of the novel system.

FIG. 5 shows a flow chart to explain the above described path of the chip. Chip is conveyed according to dotted arrows. In this case dust contained in the air sucked concurrently with the chip is removed by the dust remove 13, and conveyed to the suction port of the vacuum pump 14. Air discharged from the pump 14 is sent to the air trimmer 7 through a valve $B_2$ to convey the chip therewith. For loading valve $B_1$ is closed and valve $B_2$ is opened whereas for unloading valve $B_1$ is opened and valve $B_2$ is closed.

During unloading, the chip sucked up by the suction nozzle 9 equipped with an agitator of the pneumatic conveyer AC and located in the hold as shown in FIG. 2 is introduced into the separating tank 5 via the suction pipe 10. The chip in the separating tank 5 is discharged onto the main conveyer 2 through the rotary discharger 6 and a feeder 11. The chip on the main conveyer 2 is then supplied to the outboard conveyer equipment via the discharge conveyer 12. This path of the chip during unloading is represented by solid line arrows in FIG. 5.

Dust contained in air sucked up concurrently with the chip is removed by the dust remover 13 located above the separating tank 13. The air is then discharged into the atmosphere through the silencer 15 by the vacuum pump.

In the example shown in FIG. 1 rails are secured on the central portion of a deck to carry two carriages of the pneumatic conveyers. The illustrated embodiment includes two pneumatic conveyers per one carriage or total of four conveyer systems.

According to this invention since loading and unloading are effected by means of a vacuum suction air conveyer system, above described disadvantages of conventional grab buckets are eliminated. Except simple connecting operation of relatively light weight pipes, all operations required for loading and unloading goods can be performed by electric motor, thus requiring the minimum number of operators or supervisors.

Further as the goods are conveyed through a perfectly sealed circuit extending from the suction port to the discharge port or succeeding conveyor equipment there is no fear of leakage. As the principle of the vacuum suction air conveyer system is the same as that of a electric vacuum cleaner it is possible to unload goods in every corner of the hold by utilizing a flexible pipe, thus decreasing the time required for cleaning the bottom of the hold. Further the cost of the ship can be reduced since the size of the hatchway may be small only enough to accomodate the suction pipe. If independent vacuum suction air conveyer systems are provided for different holds, it is not necessary to provide any hatchway.

While in the above embodiment the invention has been described in terms of wood chip it will be clear that the novel system can also be applied with equal satisfactory results to the loading and unloading other loose materials such as grains or granular materials.

What is claimed is:

1. On-board loading and unloading system comprising a pneumatic conveyer movable on a deck of a ship, a hopper on said deck, a main belt conveyer extending between said pneumatic conveyer and said hopper, a first suction nozzle adapted to suck-up goods on said main conveyer, a vacuum pump associated with said pneumatic conveyer to apply suction to said first suction nozzle, a separating tank to separate air from sucked-up goods and to exhaust the separated air, an air trimmer to supply goods into a hold, a second suction nozzle associated with said pneumatic conveyer, and an outboard conveyer communicating with said pneumatic conveyer, such that during loading the goods supplied to said hopper from said outboard conveyer are conveyed to said pneumatic conveyer through said hopper and belt conveyer and then into said hold through said separating tank and said vacuum pump, whereas during unloading, the goods in said hold are conveyed to said outboard conveyer through said second suction nozzle, said separating tank, said vacuum pump and said main belt conveyer.

2. A pneumatic conveyer apparatus comprising suction means mounted on a carriage that is movable on and with respect to a ship for moving said suction means between predetermined loading and unloading stations, independent of the location of the goods to be conveyed, said suction means including: a suction nozzle for sucking up goods, a separating tank, a suction pipe interconnecting said suction nozzle and said separating tank, a rotary discharger located beneath said separating tank to transfer downwardly goods sucked up by said suction nozzle, an air trimmer located beneath said rotary discharger, and a vacuum pump connected between said air trimmer and said separating tank such that the goods supplied to said air trimmer are discharged into a hold by said vacuum pump.

References Cited

UNITED STATES PATENTS

| 2,798,628 | 7/1957 | Fisher | 302—52 XR |
| 2,865,521 | 12/1958 | Fisher et al. | 302—52 XR |
| 3,374,910 | 3/1958 | Hermanns | 214—83.28 |

FOREIGN PATENTS 738,822    7/1966    Canada.

GERALD M. FORLENZA, Primary Examiner
F. E. WERNER, Assistant Examiner

U.S. Cl. X.R.
302—12